July 29, 1969 HUGH L. DRYDEN 3,458,651

ADMINISTRATOR OF THE NATIONAL AERONAUTICS AND SPACE ADMINISTRATION

TELEVISION SIMULATION FOR AIRCRAFT AND SPACE FLIGHT

Filed Nov. 10, 1965 3 Sheets-Sheet 1

INVENTOR.
JOHN E. CONANT

BY [signature]
[signature]
ATTORNEYS

July 29, 1969 HUGH L. DRYDEN 3,458,651
ADMINISTRATOR OF THE NATIONAL AERONAUTICS
AND SPACE ADMINISTRATION
TELEVISION SIMULATION FOR AIRCRAFT AND SPACE FLIGHT
Filed Nov. 10, 1965 3 Sheets-Sheet 2

INVENTOR.
JOHN E. CONANT
BY
ATTORNEYS

INVENTOR.
JOHN E. CONANT
BY [signature]
[signature]
ATTORNEYS

United States Patent Office 3,458,651
Patented July 29, 1969

3,458,651
TELEVISION SIMULATION FOR AIRCRAFT AND SPACE FLIGHT

Hugh L. Dryden, Administrator of the National Aeronautics and Space Administration, with respect to an invention of John E. Conant, Arlington, Va.

Filed Nov. 10, 1965, Ser. No. 507,257
Int. Cl. H04n *7/00, 3/16, 5/38*
U.S. Cl. 178—6 7 Claims

ABSTRACT OF THE DISCLOSURE

A wide angle image transmission and projection system, in which a single camera is used in cooperation with a single projection unit to provide a wide angle image on a projection screen. The latter is fixedly positioned with respect to the projection unit which includes optics, rotatably controllable, to control the relative position of the projected image on the fixed screen so as to simulate roll, pitch and azimuth angle of the projected image with respect to a fixed optical axis, with which the center of the projection surface is aligned.

Origin of the invention

The invention described herein was made in the performance of work under a NASA contract and is subject to the provisions of Section 305 of the National Aeronautics and Space Act of 1958, Public Law 85–568 (72 Stat. 435; 42 USC 2457).

The subject invention relates to means for transmitting and projecting an optical image and more particularly to wide angle image transmission and projection apparatus for use in simulators for aircraft and space flight.

The satisfactory simulation of views of the earth, as viewed from a satellite, is desired for the successful training of astronauts and the like. Such simulation involves the projection of an image on a large hemispherical projection screen, representing a solid view angle of about 180°. Such projected image may be provided by means of a television system or a movie projector. However, a television system is ordinarily preferred because a plurality of images of the global terrain may be viewed in any selected sequence in which they are placed before the television camera, whereas the images on a movie film are necessarily projected in only that sequence in which they occur on the film strip.

In the past, the projection of a wide angle television image has generally been achieved by utilizing a plurality of conventional camera tubes in conjunction with a like plurality of receiver projection systems, each receiver system cooperating with an associated one of the camera tubes. In such an arrangement, each camera tube scans a preselected portion of the field of view being monitored, and transmits signals to a mutually exclusive one of the receivers. Each receiver provides an image to a portion of the projection screen corresponding to the field of view of an associated television cameras. Hence, the plurality of television receivers provide a wide angle television picture that is mosaic of the separate smaller view angles provided by the separate receivers.

Such prior art television arrangement for achieving a wide-angle display has several disadvantages. First, such an arragement, in requiring a plurality of television units, is undesirable because it is expensive and cumbersome. Also, it is difficult to mutualy align the several cameras and the several receivers so that there is no distortion, overlap or gaps between adjacent image portions of the mosaic image thus obtained. Further, such cumbersome arrangement makes difficult the simulation of relative satellite movement.

By means of the concept of the subject invention, the above recited disadvantages of the prior art are overcome, and a single television camera in cooperation with a single receiver provides a wide-angle image that readily lends itself to simulation of relative satellite movement.

In the practice of the invention, there is provided image transmission means comprising a radial array of discrete photo-sensitive signalling means arranged for relative rotation relative to an optical field of view for scanning the same. There is further provided a like number of discrete light valve means as the number of photo-sensitive means, and arranged in a second radial array for cooperation with a projection light source for modulation of discrete portions of the light beam projected therefrom in response to modulation signals from the photo-sensitive signalling means. Such second radial array is further arranged for rotation in synchronism with the rotation of the signalling array.

In normal operation of the above described arrangement, discrete elements of a radial line is a field of view are viewed or sensed by the disecrete photo-sensitive elements, which send corresponding electrical signals to corresponding light valves in the array of light valves, whereby the projection light beam is modulated to project a radial image corresponding to that sensed radial portion of the field of view. By rotating the photo-sensitive and light valve radial arrays in synchronism, a circular scan is effected which, if conducted at a speed or frequency greater than that corresponding to the persistance-of-vision phenomena of the human eye, results in a transmission and projection of the entire image encompassed by such circularly scanned field of view. An orientable single wide-angle optical system may be employed at both the viewing end and projection end of the image transmission system for reproducing an image representing a wide-angle field of view. Hence, it is an object of the invention to provide improved image transmission means.

It is another object of the invention to provide improved wide-angle image transmission means.

It is yet another object of the invention to provide wide-angle image transmission means employing a single viewing optical system and a single projection optical system.

It is still another object of the invention to provide efficient and easily orientable means for simulating a field of view.

It is a further object of the invention to provide wide view angle simulation means for projecting an image which is readily translatable and angularly orientable.

It is a further object of the invention to provide efficient image transmission means for scanning discrete portions of a field of view concomitantly.

It is still a further object of the invention to provide electronic image transmission means having improved reliability.

These and further objects will become apparent from the following description taken together with the accompany drawings in which.

In the figures, like reference characters refer to like parts.

Figure 1:
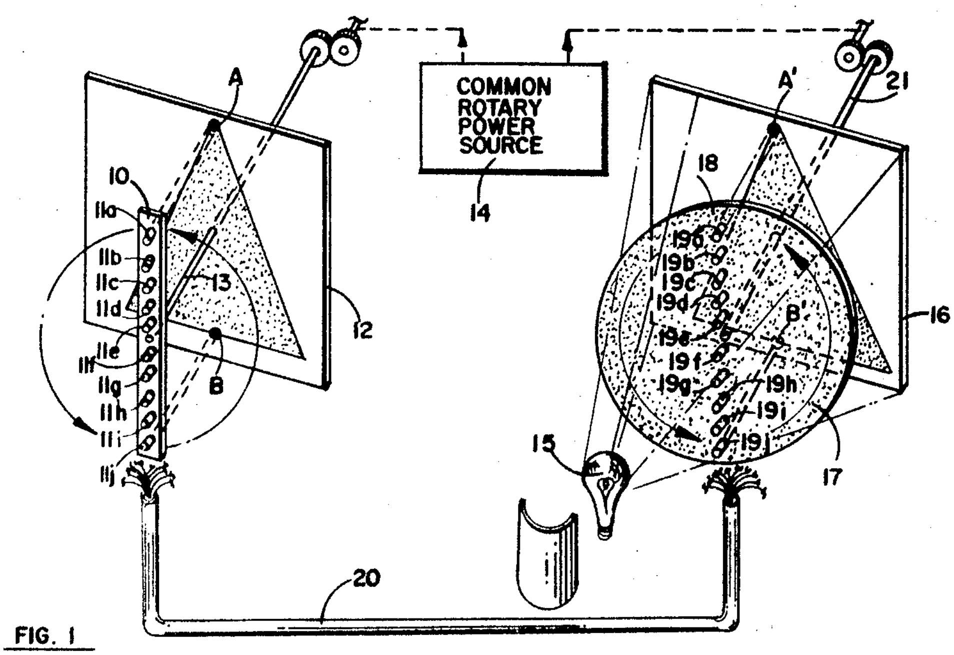
FIG. 1 is a simplified schematic arrangement of apparatus utilizing the scanning concept of the subject invention.

Referring now to FIG. 1, there is illustrated in schematic form an arrangement embodying the scanning concept of the subject invention. There is provided a radial array 10 of a plurality of discrete photo-electric signalling elements 11, extending across an intended field of view of an illuminated image. The illuminated image in such field of view is depicted in FIG. 1 as comprising two mutually-spaced characters or black dots A and B, both lying in a common image plane 12 parallel to radial array 10, each lying under a mutually exclusive one of the photo-electric signalling elements 11*a* and 11*j*, located at either extremity of array 10. Radial array 10 is further arranged for rotation about an axial line 13 relative to image plane 12 by rotary driving means 14.

As shown in FIGURE 1, the array of photo-electric signalling elements 11 will provide a plurality of separate electric signals corresponding to the discrete portions of the illuminated field of view under the surveillance of such photo electric signalling elements, the signals from elements 11*a* and 11*j* being characterized by the characterizing darkness of the discrete dots A and B against the otherwise bright background of the field of view provided by image plane 12.

There is further provided, in FIGURE 1, image projection means comprising a projection light source 15 for illuminating a projection screen 16. Interposed between source 15 and screen 16 is an opaque disc 17 pierced by a radial array 18 of discrete light valve elements 19 for controlling the illumination falling upon screen 16 from source 15, the light valve elements 19 being of a like number as the number of photo electric elements 11.

As shown in FIGURE 1, second, or light valve projection, array 18 has an angular orientation relative to screen 16 corresponding to the orientation of first or photo electric sensing array 10.

Each of the discrete light valve elements 19 of the second array 18 is responsively coupled in circuit to a corresponding one of the photoelectric signalling elements 11 of the first array 10 by means of a multiple conductor cable 20 (the detail interconnections of which are not shown). Hence, the sensors 11 provide electric signals to the radial array of light valves 19 corresponding to the discrete elements of a radial field of view sensed by radial array 10. For example, signalling elements 11*a* and 11*j* provide low level signals to a respective one of light valve elements 19*a* and 19*j*. Such signals levels correspond to the dark discrete image portions A and B on viewing plan 12 and result in the modulation of the light projected through elements 19*a* and 19*j* whereby two discrete image portions A′ and B′ are projected onto screen 16 and corresponding to viewed portions A and B of screen 12. Higher signal levels from the remaining sensor elements of array 10 are provided to corresponding ones of the remaining elements of light-modulating array 18, resulting in the projection of a correspondingly larger light level through such discrete light-modulating elements onto screen 16.

Disc 17, upon which array 18 is mounted is further arranged for rotation about an axial line 21 and driving coupled to rotary driving means 14, whereby second array 18 may be rotated in synchronism with first array 10. As radial array 10 is driven about axis 13 by drive means 14, it is clear that each of the discrete photo electric signalling elements 11 will scan a mutually concenrtic circular scanning path, whereby a plurality of mutually concentric discrete portions of the image plane 12 are scanned concomitantly, a solid view angle or circular field of view being scanned once each one-half scanning revolution. The sensed radial image for each angular position of array 10 is projected as a corresponding radial image at a corresponding angular orientation by synchronously-rotated light-modulating array 18. Where arrays 10 and 18 are synchronously rotated at a preselected speed of, say 3600 r.p.m., the field of view is scanned at twice such speed or 7200 r.p.m. Because such preselected speed represents a frequency greater than that associated with the period of persistance-of-vision phenomena of the human eye, the projected image appears not as a single radial line, but as the entire image so scanned.

Figure 3:
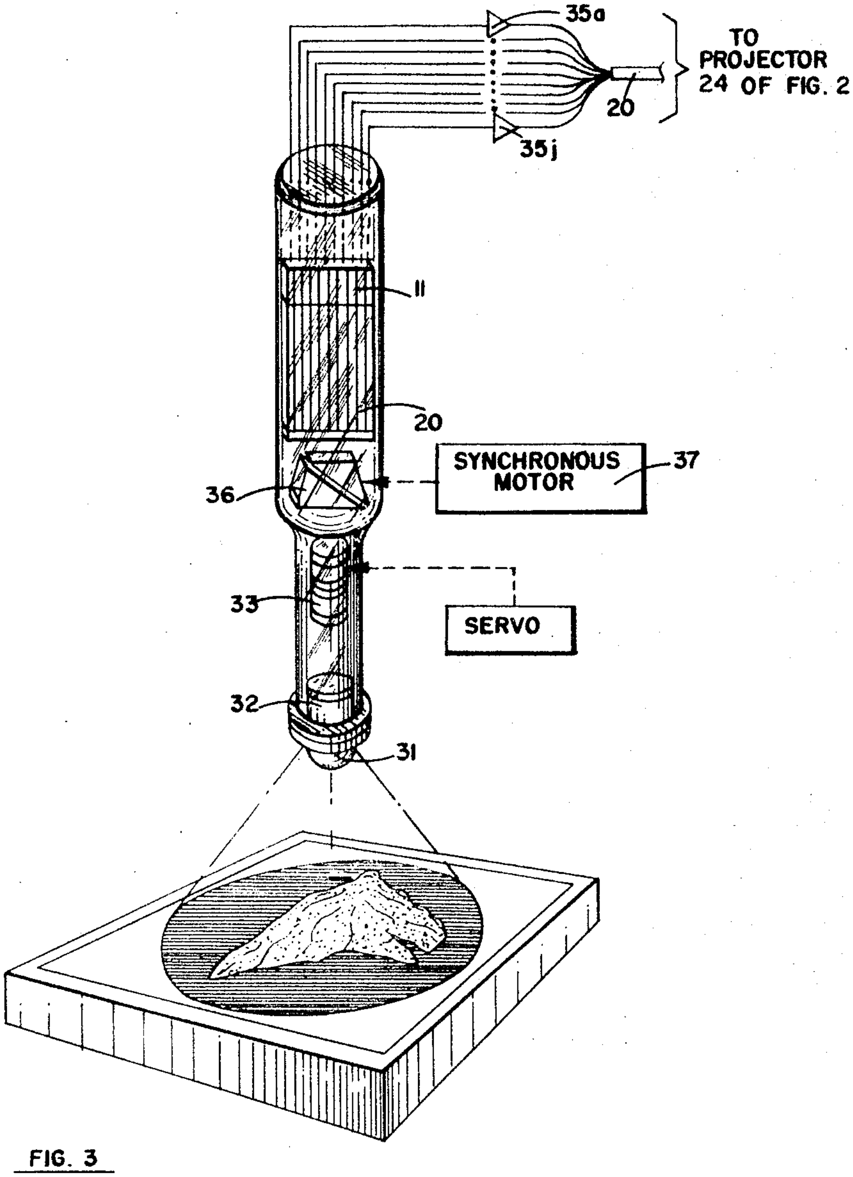
FIG. 3 is a preferred embodiment of the image transmission, or camera, device of FIG. 2.
Figure 4:
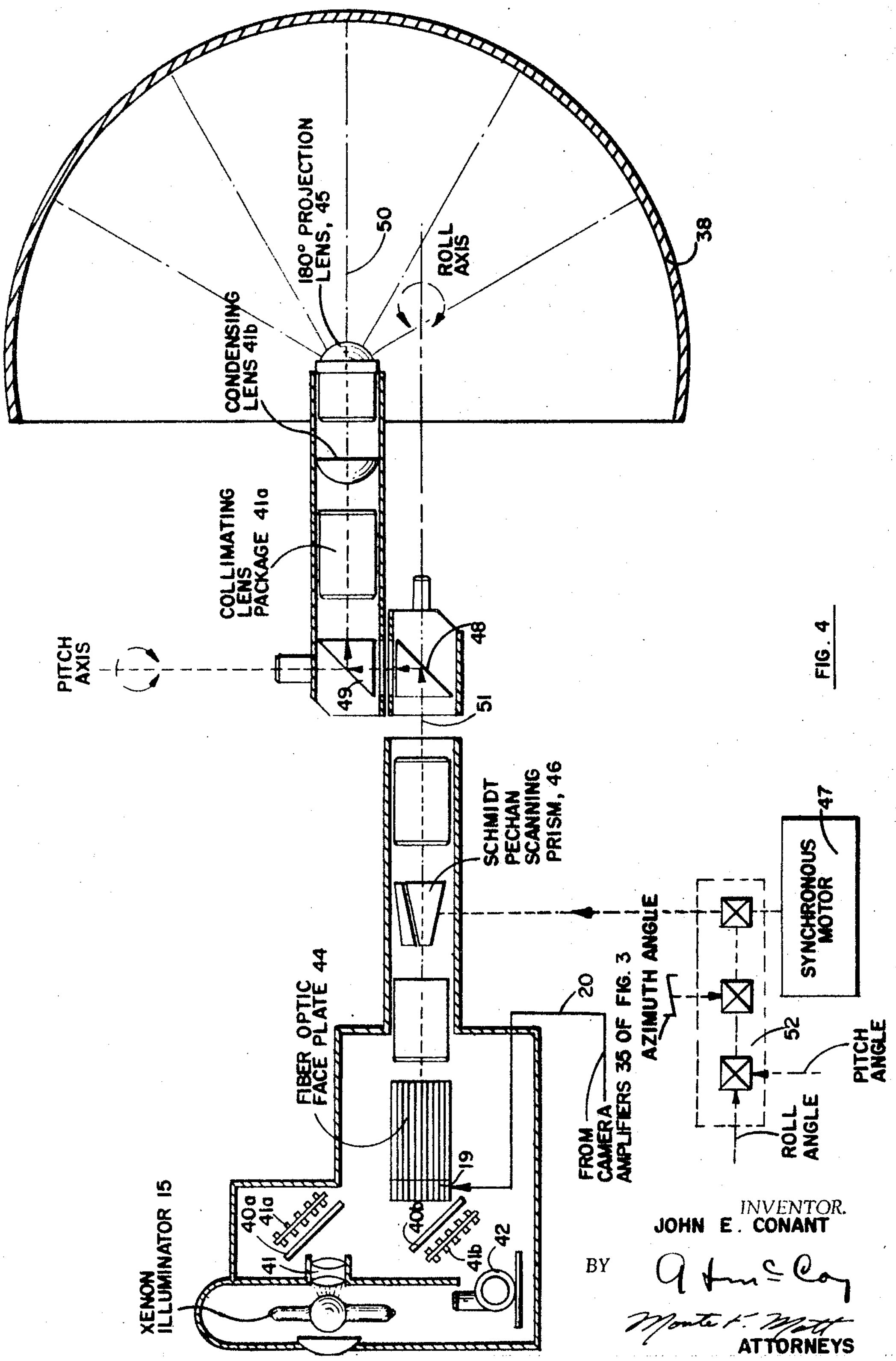
FIG. 4 is a preferred embodiment of the receiver or projection device of FIG. 2.

Although the scanning arrangement of FIGURE 1 has been described in terms of rotating the arrays 10 and 18, such aspect of the invention is not so limited, it being necessary only that relative scanning motion of each array occur relative to an associated one of optical axes 13 and 21. A disadvantage of attempting to rotate the electrically interconnected arrays 10 and 18 is the necessity of a slip-ring assembly for each, in order to avoid fouling, or entaglement, of the cable 20. A preferred and more convenient arrangement is the use of a stationary array in cooperation with scanning optics, as shown in FIGURES 2, 3, and 4.

Figure 2:
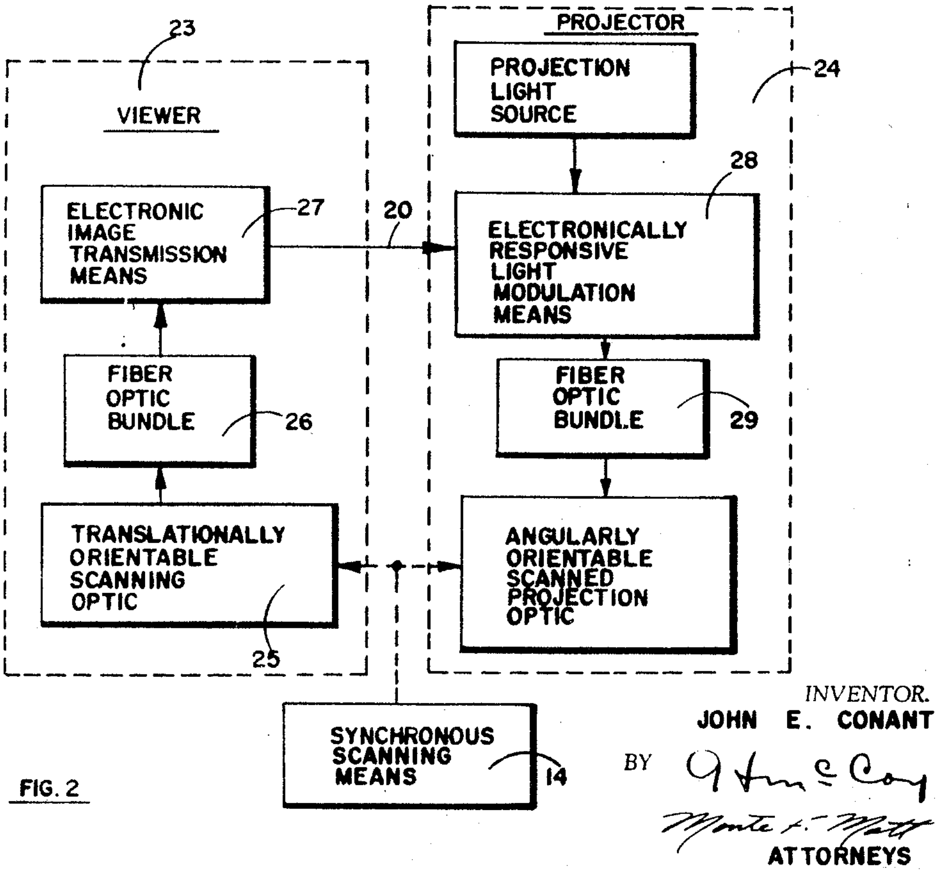
FIG. 2 is a block diagram of a system embodying the concepts of the invention.

Referring now to FIGURE 2, there is illustrated in block diagram form a system embodying the concepts of the invention. There is provided image transmission means 23 and image projection means 24 responsively coupled to transmission means 23. Image transmission means 23 is comprised of a translationally-orientable, rotationaly-scanning optical system 25 for providing a selected field of view which is made to rotate about an optical axis. Such optics are preferably translationally orientably in a plane parallel to the viewing plane in order to effect perturbations in a simulated viewing position of latitude and longitude, and are further translatable in a direction normal to the viewing plane (e.g., along the optical axis of the field of view) in order to simulate changes in the altitude of an observer.

A radial array of discrete image portions, corresponding to that image portion along a selected radial strip of the field of view, is provided in FIGURE 2 by a fiber optic bundle 26, the elements of which are arranged in a planar array, parallel to and containing the rotatable optical axis of optical system 25, and the illuminated ends of which elements lie within the image focal plane of optical ssytem 25. The purpose of fiber optic bundle 26 is to provide excitation of a plurality of photo-sensitive electrical signalling element comprising electronic image signalling means 27, each element thereof cooperating with a preselected one of fiber optic elements 26 to provide an electrical signal corresponding to a discrete portion of a sensed field of view. Such electrical signals are then separately transmitted by means of a multi-conductor cable 20 to a selected one of a plurality of discrete light-valve elements comprising electronically responsive light modulation means 28 of projection means 24.

The elements of modulation means 28 are arranged to cooperate with a projection light source to provide a radial strip of separately-modulated discrete light rays. Such discrete light rays are conducted by means of a second fiber optic bundle 29 similar to first fiber optic bundle 26 of image transmission means 23. The purpose of such second fiber optic bundle is to conduct the discrete elements of the discretely modulated radial light strip to the focal plane of an angularly-orientable rotatably scanning optic system 30, an optical axis of which intersects such light strip in such focal plane.

The rotatably scanned optics 25 and 30 are commonly responsive to driving means 14, whereby the receiving optics 30 are driven in synchronism with the transmitter scanning optics 25 to provide the projection of an electrically transmitted image, as was explained in connection with the description of FIGURE 1.

Receiver optics 30 are preferably angularly orientatable for the purpose of simulating the effects of changes in the attitude or angular orientation of a viewer's vehicle such as an astronaut's satellite vehicle. Hence, the simulation system of FIGURE 2 provides means for simulating a viewed image from a selected position or combination of altitude or perturbed latitude and longitude and at a selected attitude or angular orientation.

A preferred means for conveniently effecting rotational scanning of the fields of view relative to the transmission and projection electronics of the system in FIGURE 2 is by means of rotating prisms, as shown more particularly in FIGURES 3 and 4.

Referring to FIGURE 3, there is illustrated a preferred arrangement of the camera or image transmission means of FIGURE 2. Such camera may be made to translationally move in three mutually orthogonal directions to simulate changes in latitude, longitude and altitude by mounting the camera on three mutually perpendicular slides, and making it to move therealong by means of servo-driven lead screws (not shown), as is well understood in the art. There is provided a wide-angle lens system comprising a 180° objective lens 31 and a condensing lens 32 for providing a demagnified image of an illuminated wide angle view, and a servo driven focusing lens 33 for automatically refocusing the system in response to changes in the distance of the assembly 23 from viewed objects (corresponding to changes in simulated altitude). The cooperation of focusing lens 33 and such a servo system is well understood to those skilled in the art and therefore the construction and arrangement of such servo system is not shown. The focal plane of the optical system is thus maintained by the focusing lens 33 coincident with and containing that edge of a fiber optic bundle 26 defining a fiber optic plane, as explained in connection with FIGURE 2.

Discrete portions of the radial strip field of view provided by the elements of fiber optic bundle 26 are conducted thereby to separate ones of a plurality of photo diodes 11, for generating a plurality of electric signals corresponding to the degrees of image brightness of such discrete portions of the radial strip field of view. In a practical design, a final focusing element may be included between each photo diode and an associated portion of the fiber optic bundle. Further, an electronic signal amplifying stage 35 may be included between the output of each diode 11 and the associated conductors of cable 20. Although such amplifiers could be located alternatively at the receiver or projector end of cable 20, it may be preferable to locate them at the input end of cable 20, as shown in FIGURE 3, in order to avoid the amplification of noise and stray signals picked up by cable 20. If desired, of course, line drive amplifiers may be employed at both ends of cable 20.

In the arrangement of FIGURE 3, neither the viewed object nor the photo-sensitive electronics are rotated in order to effect scanning. Instead, the optical image provided by the viewing optics at the fiber optic plane is made to rotate about the optical axis relative to the fiber optic bundle by means of a scanning Pechan prism 36 interposed between focusing lens 33 and the fiber optic plane, and is driven by a synchronous motor 37. By means of such an arrangement, successive radial strip portions of the demagnified field of view are rotated past the radial strip optics of the fiber optic plane, whereby scanning of the field of view is effected by photo diodes 11. The arrangement and cooperation of a scanning or Pechan prism to effect rotation of a field of view about an optical axis is well understood in the art, being explained for example at pp. 13–36 of that volume of the military standardization handbook series entitled "Optical Design" and designated MIL–HDBK–141, Oct. 5, 1962, published by the Defense Supply Agency of the U.S. Department of Defense, Washington 25, D.C.

The image resolution thus provided by the scanning system of FIGURE 3 is limited only by the number of photo sensitive diodes (and associated amplifiers 35) employed, corresponding to the number of discrete elements of the radial strip thus sensed. Further, the reliability of the scanning system is substantially enhanced, as will be more fully explained hereinafter.

A projector scanning arrangement similar to that in the transmitter scanner of FIGURE 3 is employed in the projection system, as shown more particularly in FIGURE 4.

Referring to FIGURE 4, there is illustrated a preferred arrangement of the projection apparatus of FIGURE 2. There is provided a high-intensity projector 15, comprising a xenon lamp, for example, for providing sufficient illumination of a wide-angle (hemispherical) projection screen 38 after attenuation and magnification by the projection optics. The light from such projection light source is condensed and collimated by a lens system 43 provided for such purposes, and then directed at a radial array of light modulation means 19 such as Kerr cells by means of heat transmission mirrors **40*a* and 40*b*. Cooperating with each of mirrors 40*a* and 40*b* is a heat sink 41*a* and 41*b* for control and removal of the large amount of heat associated with the generation of such high-intensity light energy. The illumination projector may further include a blower fan 42**, or the like for ventilating and cooling the projector.

Each of the Kerr cells 19 is responsively connected to a corresponding one of the amplifiers 35 by means of multiconductor cable 20, and is oriented so that the optical axis thereof is parallel to the collimated beam of light from the projection light source.

As is well understood in the art, the Kerr cell employs the principle of double refraction of polarized light, observed in certain liquids such as nitrobenzene. Thus, if a beam of light is polarized and passed into a cell filled with nitrobenzene in the presence of an electrostatic field, the polarized light beam will be rotated through an angle that varies as a function of the strength of the electrostatic field. Such a cell may be constructed, for example, of an optically transparent, electrostatic material such as quartz filled with nitrobenzene, with one of a pair of electrostatic plates on either of two opposing sides of the cell (parallel to an intended optical axis), and with a pair of light polarizers at the two opposing ends of the optical axis, the polarization planes of the two mutually parallel polarizers being oriented mutually in space quadrature or rotated at 90° to each other.

In normal operation of such Kerr cell arrangement, when the optical axis thereof is interposed in the path of a beam of light, light impinging upon a first one of the polarizers does not emerge from the Kerr cell (in the absence of an applied electrostatic field), because the plane of polarization of such subsequently polarized light is at right angles to the second polarizer. Upon the application of an electrostatic field across the plates of the cell, the plane of polarization of such polarized light is rotated by an amount determined by the strength of such field, and an attenuated portion of such light is transmitted therethrough, the attenuation being a function of the angular difference between the respective polarization planes of such polarized light and the second polarizing element. Hence, a modulated light beam is provided, the brightness of which is made to vary with variations in the strength of an applied electrostatic field. A more complete description of the arrangement and cooperation of a Kerr cell may be found in an article "Theory and Technique of Kerr Cells" by F. G. Dunnington, at page 1506 of vol. 28 of the 1931 edition of Physical Review, published by the American Institute of Physics.

Accordingly, it is understood that the array of Kerr cells 19 (of FIGURE 4) provides a radial strip pattern of modulated light, discrete radial portions of such pattern comprising modulated discrete light rays. Such discrete light rays are conducted in such radial line pattern by means of a fiber optic 44 bundle to the focal plane of a projection optics system, such conducted radial line pattern lying within such focal plane.

The discretely modulated radial light strip is projected through the projection optics comprising a 180° or wide angle projection lens 45 onto screen 38 to provide a radial strip image corresponding to that viewed by the photodiode array of FIGURE 3. Interposed between the fiber optic bundle 44 and the hemispherical projection lens 45 is a scanning prism system 46 such as a Schmidt-Pechan prism, driven by driver means 47 for rotating the radial projection image in synchronism with the scanning optics of the camera arrangement of FIGURE 3. Such synchronous rotation may be effected by employing synchronous electric motors commonly connected to a single common source of polyphase electric power for both the drive means 37 and 47 (of FIGURES 3 and 4, respectively). In this way, the projector reproduces the mutually concentric scan lines of the scanned image transmitted by the arrangement of FIGURE 3. The wide angle projection lens system of FIGURE 4, being similar to the camera lens system of FIGURE 3 will remove from the projected image those radial distortions introduced by the camera lens.

There is further provided in FIGURE 4 a right angle prism arrangement comprising a first and second right angle prism 48 and 49 respectively for laterally translating the optical axis 50 of projection lens 45 from that of scanning prism 46. Rotation of the projected image (or simulated roll motion) is achieved by rotating the first and second right angle prisms 48 and 49, and hemispherical lens 45 all as a single unit of the first prism 48 as a roll axis. Simulated pitching motion or rotation of the projection optical axis 50 of hemispherical lens 45 is achieved by rotation of lens 45 and second prism 49 about an optical axis of prism 48 perpendicular to the projection optical axis 51. Such optical pitch and roll motions may be produced by rotational-driving servo means (not shown).

The above described arrangement for effecting pitch and roll image motion allows the design of a projector having an optic center then can be placed very close to the head of an observer or astronaut-to-be-trained, thereby reducing the adverse effects of projector angle parallax in the projected picture. However, as is well understood in the art, such angular motion of the right angle prisms 48 and 49 also produces associated unwanted component angular motions of the projected image relative to the projector optical axis. Such unwanted angular motion may be prevented by coupling the prism motion through a mechanical differential mechanism 52 interposed between the scanning optics 46 and the scan drive motor 47. The selected gear motion of a rotating prism relative to a rotated right angle prism in order to prevent unwanted angular motion or "falling" of the rotating image is well-understood in the optical art, as is indicated for example at pages 83–87 of vol. I of the Ordnance Corps Manual entitled "Design of Fire Control Optics" and designated ORDM 2–1, August 1952, published by the Ordnance Corps of the United States Army, Washington 25, D.C. One additional digerential input is included in differential mechanism 52 (of FIGURE 4) and may be servo-driven as a function of a desired heading angle in order to simulate aircraft heading.

Accordingly, low inertia means are provided for efficiently and effectively simulating high rates of roll, pitch and heading. Also, by means of the above described arrangement, angular and translational motion of a viewed image may be simulated. Further, such orientable image transmission and projection apparatus includes means for scanning a plurality of image scan lines concurrently rather than sequentially. Hence, the resultant image resolution and scanning speed are mutually independent, the image resolution being determined only by the number of discrete elements in the radial scanning arrays. Moreover, because the plurality of scan lines are scanned concomitantly by separate ones of a plurality of signalling channels, the reliability of the signalling system is substantially greater than that of the prior art method of single channel means for sequentially scanning a plurality of scan lines. In other words, the failure of a given one of the plurality of signalling channels of the subject invention only serves to reduce the image resolution in the corresponding portion of the scanned image, rather than resulting in a total loss, of the image scanning function for the entire image. Therefore, improved image transmission and projection means have been described.

Although the invention has been illustrated and described in detail, it is to be clearly understood that the same is by way of illustration and example only and is not to be taken by way of limitation, the spirit and scope of this invention being limited only by the terms of the appended claims.

What is claimed is:

1. Image transmission nad projection means comprising:

means for concomitantly scanning a plurality of mutually concentric scan line defining an image field-to-be-transmitted for providing a like plurality of scan line signals;

a fixed surface for projecting an image thereon;

projection means including scanning means responsive to said scan line signals for concomitantly projecting on said surface a like plurality of mutually concentric scanned projection lines as said scanned image lines, said projection means defining an optical axis, fixedly positoned with respect to said surface, and including first and second right angle lenses and a single projection lens, said first right angle lens being disposed on said optical axis and said second right angle lens and said projection lens being disposed on an adjacent axis, parallel said otpical axis; and means responsive to image orientation control signals for controlling the positions of at least said second right angle lens and said projection lens with respect to said optical axis, said projection means to control the loctaions at which said mutually concentric scanned projection lines are projected on said surface.

2. Wide angle image transmission and projection means comprising:

a single objective lens system for providing a translationally orientable field of view having a view angle of substantially 180°;

first means including a first scanning prism in cooperation with said lens system for providing a rotating field of view having a reduced view angle;

a plurality of mutually parallel fiber optic elements in a radial array across said rotating field of view;

a like plurality of photo-sensitive diodes as said fiber optic elements, each said diode arranged to be responsive to a mutually exclusive one of said fiber optic elements for providing an electrical output signal;

a like plurality of discrete Kerr cells as said photodiodes arranged in a radial array for modulating a source of projection light, each cell being responsive to the electrical output signal from a mutually exclusive one of said photo-sensitive diodes for modulating a discrete portion of said prejection light;

second means including a second scanning prism for scanning said radial pattern of discrete modulated projection light about a fixed optical axis of said projection field in synchronism with said rotating field of view, the rotational speed having in excess of that frequency corresponding to the image persistence of human vision;

a surface, fixedly positioned with respect to said optical axis for projecting an image thereon;

a projection lens system for projecting on said surface the modulated projection light in an orientable projection field of about 180°, said projection lens system including first and second right angle lenses on a common axis perpendicular said optical axis and a single projection lens, said first right angle lens being disposed on said optical axis and said second right angle lens and said projection lens being disposed on an adjacent axis, parallel said optical axis; and control means for selectively controlling the positions of said first and second right angle lenses and said projection lens with respect to said optical axis, to control the orientation of said projected image on said surface about an axis extending through the surface center which is parallel to said optical axis.

3. The image transmission and projection means as recited in claim 2 wherein said control means control the relative linear motion of said field of view in a direction perpendicular to said optical axis.

4. Electro-optical image transmission and projection means comprising:

means for rotating an optical field of view about an optical axis thereof;

a plurality of mutually parallel fiber-optic elements in a linear array extending radially across said rotating field of view, an optically sensitive end of said array being responsive to said field of view;

a like number of photo-sensitive electronic signalling channels as said fiber-optic elements, a mutually exclusive one of said signalling channels being responsive to a mutually exclusive one of said elements of said arrays;

a like number of electronic light valve means as said electronic signalling channels, arranged in a radial linear array for cooperation with a projection light source for providing a radial pattern of discrete modulated rays of projected light;

a fixedly positioned image projection screen;

means for rotating said radial pattern of discretely modulated rays of projected light relative to said image projection screen about a selected optical axis in synchronism with the rotation of said rotating field of view, said optical axis being fixed with respect to said screen;

lens means, disposed between said means for rotating said screen said lens means including first and second right angle lenses on a common axis perpendicular to said optical axis and a single projection lens, said first right angle lens being disposed on said optical axis and said second right angle lens and said projection lens being disposed on an adjacent axis, parallel said optical axis; and control means responsive to control signals for providing rotational motion to said means for rotating and to said lens means to simulate a movable projected image on said projection screen, said control means control at least the relative orientations of said second right angle prism and said projection lens with respect to said optical axis.

5. The transmission and projection means as recited in claim 4 wherein said control means include means to control at least the roll and pitch of said projected image on said projection screen with respect to an axis defined by the center of said screen.

6. The transmission and projection means as recited in claim 4 wherein each of said electronic light valves is a Kerr cell responsive to the output of a different one of said photo-sensitive electronic signalling channels to provide a discrete modulated ray of projected light.

7. The transmission and projection means as recited in claim 4 wherein said control means include means to control at least the roll and pitch of said projected image on said projection screen with respect to an axis defined by the center of said screen, the roll being controlled by controlling the orientations of said first and second right angle lenses and said projection lens with respect to said optical axis, and the pitch being controlled by controlling the orientations of said second right angle lens and said projection lens about an axis extending through said first right angle lens, perpendicular to said optical axis.

References Cited

UNITED STATES PATENTS

| | | | |
|---|---|---|---|
| 1,423,737 | 7/1922 | Sandell | 178—7.6 |
| 1,990,544 | 2/1935 | Gray. | |
| 3,184,732 | 5/1965 | Haynes. | |
| 3,249,692 | 5/1966 | Clay | 178—7.6 |
| 3,275,743 | 9/1966 | Conant | 178—6.8 |
| 1,693,969 | 12/1928 | Villiger | 352—69 |
| 2,234,987 | 3/1941 | Soller | 178—7.3 |
| 2,438,137 | 3/1948 | Waller | 352—69 |

FOREIGN PATENTS

| | | |
|---|---|---|
| 556,320 | 9/1943 | Great Britain. |

RALPH D. BLAKESLEE, Primary Examiner

JOSEPH A. ORSINO, Jr., Assistant Examiner

U.S. Cl. X.R.

178—7.1, 7.3, 7.6; 250—234, 235, 286